US011794803B2

(12) United States Patent
Kodera

(10) Patent No.: US 11,794,803 B2
(45) Date of Patent: Oct. 24, 2023

(54) STEERING CONTROLLER

(71) Applicant: JTEKT CORPORATION, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 338 days.

(21) Appl. No.: 17/195,813

(22) Filed: Mar. 9, 2021

(65) Prior Publication Data

US 2021/0284226 A1 Sep. 16, 2021

(30) Foreign Application Priority Data

Mar. 11, 2020 (JP) ................................ 2020-041992

(51) Int. Cl.
*B62D 5/04* (2006.01)
*B62D 6/00* (2006.01)

(52) U.S. Cl.
CPC ............. *B62D 5/0463* (2013.01); *B62D 6/00* (2013.01); *B62D 6/002* (2013.01); *B62D 6/008* (2013.01)

(58) Field of Classification Search
CPC ........ B62D 5/0463; B62D 6/00; B62D 6/003; B62D 6/008; B62D 15/025; B62D 15/027; B62D 1/286; B62D 5/005; B62D 5/0481; B62D 5/046
USPC ............................................ 701/41; 180/446
See application file for complete search history.

(56) References Cited

U.S. PATENT DOCUMENTS

| 9,914,473 B2* | 3/2018 | Tamaizumi | .......... B62D 5/0463 |
| 2016/0229446 A1* | 8/2016 | Tamaizumi | ............ B62D 6/002 |
| 2019/0359248 A1* | 11/2019 | Tsubaki | ............... B62D 5/0463 |
| 2019/0367079 A1* | 12/2019 | Kodera | .................. B62D 6/002 |

FOREIGN PATENT DOCUMENTS

| CN | 107128355 A | * 9/2017 | .......... B62D 5/0409 |
| JP | 2016-144974 A | 8/2016 | |
| JP | 6439473 B2 | * 12/2018 | ........... B62D 5/0463 |

OTHER PUBLICATIONS

A Derwent-translated version for CN-107128355-A (Year: 2017).*
X. Wang, W. Wang, L. Li, J. Shi and B. Xie, "Adaptive Control of DC Motor Servo System With Application to Vehicle Active Steering," in IEEE/ASME Transactions on Mechatronics, vol. 24, No. 3, pp. 1054-1063, Jun. 2019, doi: 10.1109/TMECH.2019.2906250 (Year:2019).*

(Continued)

*Primary Examiner* — Cuong H Nguyen
(74) *Attorney, Agent, or Firm* — Oliff PLC

(57) ABSTRACT

A steering controller includes a torque command value calculator configured to calculate a torque command value used as a target value of the motor torque. The torque command value calculator has a hysteresis component calculator configured to calculate a hysteresis component added such that the command value component has hysteresis characteristics and changes accordingly with respect to change of a state quantity that changes in accordance with operation of the steering device. The hysteresis component calculator is configured to calculate the hysteresis component by adding the hysteresis differential component to the hysteresis basic component.

4 Claims, 9 Drawing Sheets

(56) References Cited

OTHER PUBLICATIONS

Wozniak, M., Rylski, A., & Siczek, K. (2022). The Measurement of the Wear of Tie Rod End Components. Strojniški Vestnik—Journal of Mechanical Engineering, vol. 68(No. 2), 101-125. https://doi.org/10.5545/sv-jme.2021.7389 (Year:2022).*

A. Balachandran and J. C. Gerdes, "Designing Steering Feel for Steer-by-Wire Vehicles Using Objective Measures," in IEEE/ASME Transactions on Mechatronics, vol. 20, No. 1, pp. 373-383, Feb. 2015, doi: 10.1109/TMECH.2014.2324593; (Year:2015).*

Balachandran, Avinash, and J. Christian Gerdes. "Designing steering feel for steer-by-wire vehicles using objective measures." IEEE/ASME transactions on mechatronics 20, No. 1 (2014): 373-383. (Year:2014).*

* cited by examiner

STEERING CONTROLLER

CROSS-REFERENCE TO RELATED APPLICATION

This application claims priority to Japanese Patent Application No. 2020-041992 filed on Mar. 11, 2020, incorporated herein by reference in its entirety.

BACKGROUND

1. Technical Field

The disclosure relates to a steering controller.

2. Description of Related Art

Vehicle steering devices include an electric power steering device (EPS) that uses a motor to apply assist force that is for assisting a driver to perform steering. The vehicle steering devices also include a steering unit steered by a driver and a turning device that turns turning wheels in accordance with the steering performed by the driver. In a steer-by-wire (SBW) steering device, a steering-side motor provided in a steering unit applies steering reaction force that resists steering by a driver, and a turning-side motor provided in a turning unit applies turning force to turn turning wheels.

A steering controller that controls such steering devices as control targets achieves improvement in steering feeling by calculating, based on various components, a command value of motor torque applied to the steering device by the motor. For example, a steering controller disclosed in Japanese Patent Application Publication No. 2016-144974 calculates a torque command value based on a value obtained by subtracting, from a basic component of assist force based on the steering torque, a hysteresis component corresponding to a turn or return steering state. The steering controller changes the hysteresis component based on spring characteristics of a vehicle that is mounted with the steering device so as to adjust and optimize the steering feeling.

SUMMARY

Incidentally, in recent years, there are growing needs to improve the steering feeling in the steering device. In fact, it cannot be said that the steering feeling satisfies a requested level even with the above configuration being employed. Accordingly, it has been expected to create a new technology that can implement a better steering feeling.

The disclosure provides a steering controller capable of achieving improvement in the steering feeling.

A steering controller according to an aspect of the disclosure is configured to control a steering device, the steering device being configured to make steering torque variable by using motor torque, the steering torque being used for steering a steering wheel, the motor torque being applied by an actuator that uses a motor as a driving source. The steering controller includes a torque command value calculator configured to calculate a torque command value used as a target value of the motor torque. The steering controller controls operation of the motor so as to generate the motor torque corresponding to the torque command value. The torque command value calculator has a command value component calculator configured to calculate a command value component that is added for calculation of the torque command value, and a hysteresis component calculator configured to calculate a hysteresis component that is added such that the command value component has hysteresis characteristics and changes accordingly with respect to change of a state quantity that changes in accordance with operation of the steering device. The hysteresis component calculator has a hysteresis basic component calculator configured to calculate, based on the state quantity, a hysteresis basic component as a basic component of the hysteresis component, the hysteresis basic component varying such that an absolute value of the hysteresis basic component becomes larger and an absolute value of a hysteresis gradient becomes smaller as the state quantity becomes larger, the hysteresis gradient being an amount of change with respect to the state quantity, and a hysteresis differential component calculator configured to calculate a hysteresis differential component that is a component obtained by differentiating the hysteresis basic component. The hysteresis component calculator is configured to calculate the hysteresis component by adding the hysteresis differential component to the hysteresis basic component.

Here, by adding the hysteresis basic component, it becomes possible to give a driver a response to steering. In order to give the driver a noticeable response as the response to steering, it is conceivable to increase a hysteresis gradient, which is a gradient at the rising edge of the hysteresis basic component, and thereby enhance the responsiveness. In this case, when the hysteresis gradient is forcibly increased and thereby the responsiveness is excessively enhanced, characteristics of vibration response become notable in the hysteresis basic component due to such reasons as insufficient response performance, which is disadvantageous in respect of stability. In other words, increasing the hysteresis gradient of the hysteresis basic component and enhancing the responsiveness for the purpose of giving a driver a noticeable response have limitations.

To cope with these limitations, in the above configuration, the hysteresis differential component acts so as to restrain the characteristics of vibration response generated in the hysteresis basic component. This means that it becomes possible to restrain the characteristics of vibration response when the hysteresis gradient of the hysteresis basic component is increased. Thus, it becomes possible to expand the limitations of the responsiveness that can be enhanced by increasing the hysteresis gradient of the hysteresis basic component as compared with the case where the hysteresis differential component is not added. Therefore, as compared with the case where the hysteresis differential component is not added, it becomes possible to design the hysteresis basic component with a larger hysteresis gradient and enhanced responsiveness. As a result, a noticeable response can be given to a driver, and improvement in steering feeling can be achieved.

In the above aspect, the hysteresis basic component calculator may be configured to change the hysteresis basic component based on a change amount of an angle of a rotary shaft that rotates in relation to steering of the steering wheel.

According to the above configuration, when, for example, the hysteresis basic component is changed such that the hysteresis gradient is made smaller and the responsiveness is made lower, as the change amount of the angle of the rotary shaft that rotates in relation to the steering of the steering wheel is larger, the driver can smoothly perform steering operation with a steering response restrained in the case of a quick steering. Thus, it becomes possible to give the driver a noticeable response, or to enable the driver to perform smooth steering operation, and therefore an appropriate steering feeling corresponding to the steering state of the steering wheel can be set. Therefore, the above configuration is effective for achieving improvement in the steering feeling.

In the above aspect, the hysteresis basic component calculator may be configured to change the hysteresis basic component based on a vehicle speed. According to the configuration, when, for example, the hysteresis basic component is changed such that the hysteresis gradient is made larger and the responsiveness is enhanced, as the vehicle speed is smaller, it becomes possible to give a driver a sufficient response at the time of stopping the vehicle. Thus, it becomes possible to give the driver a noticeable response, or to give the driver a sufficient response, and therefore an appropriate steering feeling corresponding to the travel state of the vehicle can be set. Therefore, the above configuration is effective for achieving improvement in the steering feeling.

Here, when the hysteresis basic component is changed based on the vehicle speed, the hysteresis differential component, which is the component obtained by differentiating the hysteresis basic component, is also changed based on the vehicle speed in the natural course of events. However, the hysteresis differential component changed based on the vehicle speed in the natural course of events is not necessarily appropriate for the purpose of improving the steering feeling.

Accordingly, in the above configuration, the hysteresis differential component calculator may be configured to change the hysteresis differential component based on the vehicle speed. According to the configuration, in the case where the hysteresis basic component is changed based on the vehicle speed, it becomes possible to calculate the hysteresis differential component, which is added to the hysteresis basic component, as an appropriate component for the purpose of improving the steering feeling. Thus, the above configuration can contribute to improvement in the steering feeling.

According to the steering controller of the above aspect, improvement in the steering feeling can be achieved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment in which a steering controller is applied to a steer-by-wire steering device will be described with reference to the drawings.

Figure 1:
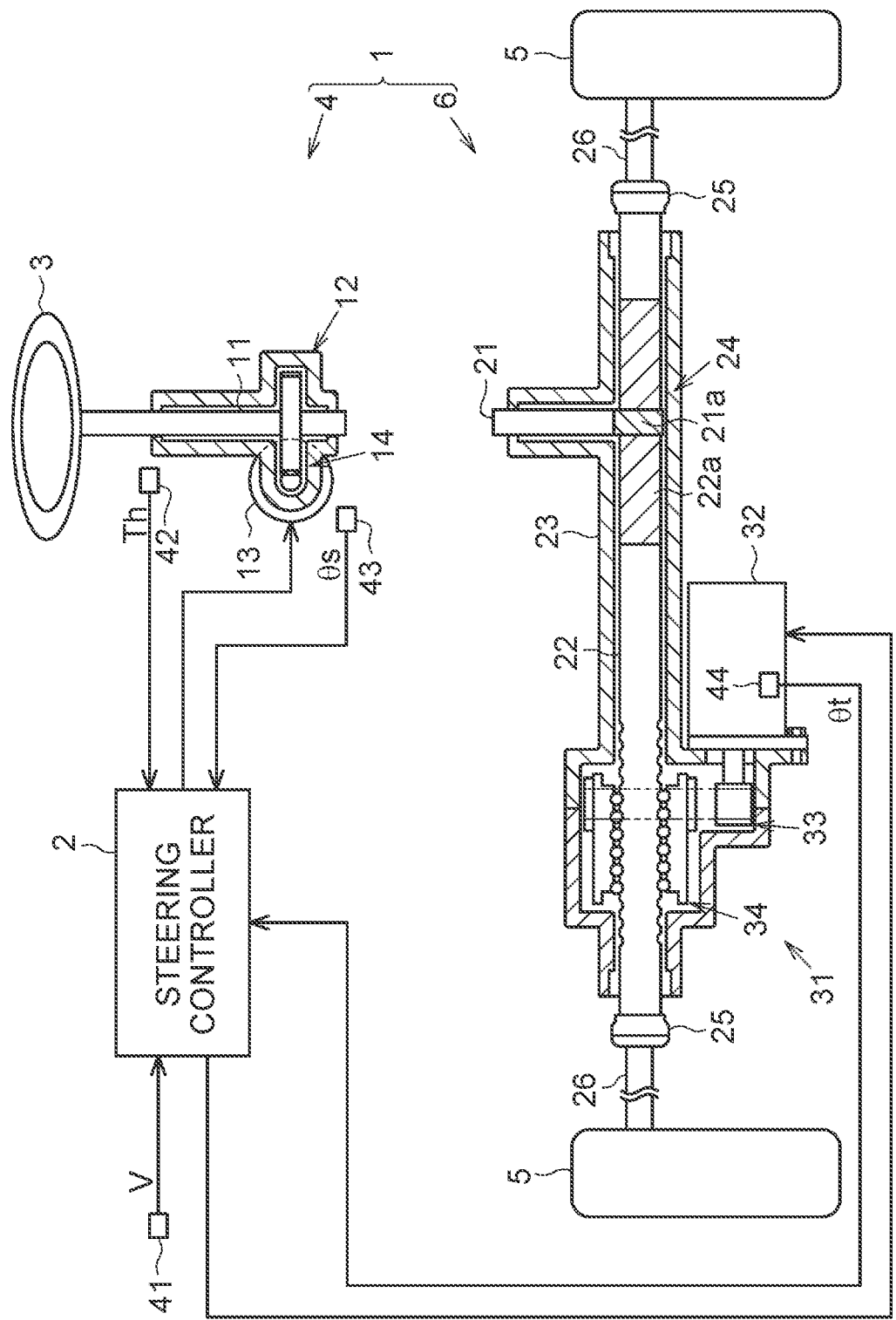
FIG. 1 is a schematic block diagram of a steering device.

As shown in FIG. 1, a steering device 1 of the present embodiment is a steer-by-wire steering device. The steering device 1 includes a steering controller 2 that controls operation of the steering device 1. The steering device 1 includes a steering mechanism 4 steered by a driver through a steering wheel 3, and a turning mechanism 6 that turns turning wheels 5 in accordance with steering of the steering mechanism 4 by the driver. The steering device 1 of the present embodiment has a structure in which a motive power transmission path between the steering mechanism 4 and the turning mechanism 6 is mechanically separated all the time.

The steering mechanism 4 includes a steering shaft 11 coupled with the steering wheel 3, and a steering-side actuator 12 that applies steering reaction force that resists steering to the steering wheel 3 through the steering shaft 11.

The steering-side actuator 12 includes a steering-side motor 13 used as a driving source, and a speed reducer 14 made of a worm and wheel. The steering-side motor 13 is coupled with the steering shaft 11 through the speed reducer 14.

The turning mechanism 6 includes a pinion shaft 21, a rack shaft 22 used as a turning shaft coupled with the pinion shaft 21, a rack housing 23 that houses the rack shaft 22 reciprocatably in an axial direction, and a rack and pinion mechanism 24 constituted of the pinion shaft 21 and the rack shaft 22. The rack shaft 22 and the pinion shaft 21 are disposed at a prescribed crossing angle in the rack housing 23. The rack and pinion mechanism 24 is configured by gearing of a pinion gear tooth 21a formed on the pinion shaft 21 and a rack tooth 22a formed on the rack shaft 22 with each other. The rack shaft 22 has both ends coupled with a tie rod 26 through rack ends 25 that are formed of ball joints. The ends of the tie rod 26 are coupled with unillustrated knuckles that are attached to the turning wheels 5.

The pinion shaft 21 is provided to support the rack shaft 22 inside the rack housing 23. Specifically, the rack shaft 22 is pressed toward the pinion shaft 21 while being supported movably along its axial direction by an unillustrated support mechanism provided in the turning mechanism 6. Thus, the rack shaft 22 is supported inside the rack housing 23. The rack shaft 22 is also restrained from rotating. Instead of the pinion shaft 21, another support mechanism that supports the rack shaft 22 in the rack housing 23 may be provided. In that case, the turning mechanism 6 configured without the pinion shaft 21 may be adopted.

The turning mechanism 6 includes a turning-side actuator 31 that applies motive power to the rack shaft 22 in order to move the rack shaft 22 in an axial direction so as to turn the turning wheels 5. The turning-side actuator 31 includes a turning-side motor 32 used as a driving source, a belt mechanism 33, and a ball screw mechanism 34. The turning-side actuator 31 transmits the rotation of the turning-side motor 32 to the ball screw mechanism 34 through the belt mechanism 33. In the ball screw mechanism 34, the turning-side actuator 31 converts the rotation of the turning-side motor 32 into reciprocation of the rack shaft 22 in an axial direction so as to apply the motive power to the rack shaft 22.

In the steering device 1 configured in this way, the motor torque is applied as motive power to the rack shaft 22 from the turning-side actuator 31 in accordance with the steering performed by a driver. As a result, the steering angle of the turning wheels 5 is changed. At the time, the steering-side actuator 12 applies steering reaction force, which resists the steering performed by the driver, to the steering wheel 3. In short, in the steering device 1, a steering torque Th that is necessary for steering the steering wheel 3 is changed by the steering reaction force that is the motor torque applied from the steering-side actuator 12.

As shown in FIG. 1, the steering-side motor 13 and the turning-side motor 32 are connected to the steering controller 2 that controls driving of the motors 13, 32. The steering controller 2 controls driving of the motors 13, 32 by controlling supply amounts of current that are controlled variables of the motors 13, 32, based on detection results of various kinds of sensors. Examples of the various kinds of sensors include a vehicle speed sensor 41, a torque sensor 42, a steering-side rotational angle sensor 43, and a turning-side rotational angle sensor 44.

The vehicle speed sensor 41 detects a vehicle speed value V which is a value indicating the vehicle speed that is the travelling speed of a vehicle. The torque sensor 42 detects the steering torque Th which is a value indicating the torque applied to the steering shaft 11 by the steering performed by the driver. The steering-side rotational angle sensor 43 detects a steering-side rotation angle θs, which is the angle of a rotary shaft of the steering-side motor 13, within a range of 360°. The turning-side rotational angle sensor 44 detects a turning-side rotation angle θt, which is the angle of a rotary shaft of the turning-side motor 32, within a range of 360°. The steering torque Th, the steering-side rotation angle θs, and the turning-side rotation angle θt are detected as, for example, positive values when the vehicle is steered rightward and as negative values when the vehicle is steered leftward.

Description is now given of the function of the steering controller 2. The steering controller 2 includes a central processing unit (CPU) and a memory which are not illustrated. The CPU executes programs stored in the memory every prescribed operation period. Thus, various kinds of processes are executed.

Figure 2:
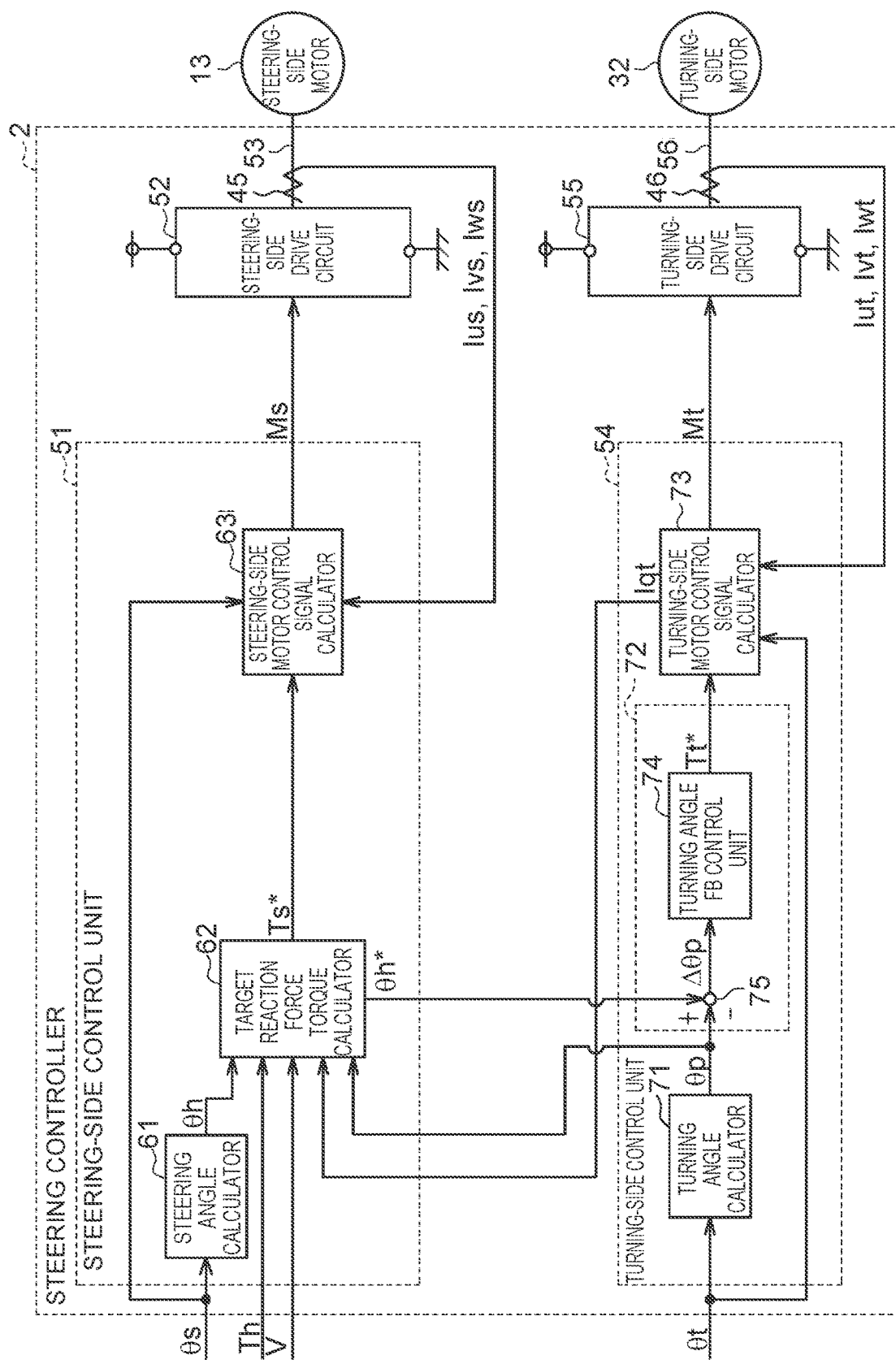
FIG. 2 is a block diagram showing the function of a steering controller.

FIG. 2 shows some of the processes executed by the steering controller 2. The processes shown in FIG. 2 are some of the processes implemented by the CPU executing the programs stored in the memory. The processes are illustrated for each type of processes that are implemented.

The steering controller 2 includes a steering-side control unit 51 that outputs a steering-side motor control signal Ms, and a steering-side drive circuit 52 that supplies drive electric power to the steering-side motor 13 based on the steering-side motor control signal Ms. The steering-side control unit 51 is connected to steering-side current sensors 45 that detect current values of the steering-side motor 13 corresponding to respective phases Ius, Ivs, Iws that flow through connection lines 53 between the steering-side drive circuit 52 and motor coils of the steering-side motor 13 corresponding to the respective phases. The steering-side current sensors 45 acquire, as electric currents, voltage drops in shunt resistors, which are connected to the source side of respective switching elements in an unillustrated inverter provided corresponding to the steering-side motor 13. In FIG. 2, for convenience of description, the connection lines 53 corresponding to the respective phases and the steering-side current sensors 45 corresponding to the respective phases are each illustrated as a single component.

The steering controller 2 includes a turning-side control unit 54 that outputs a turning-side motor control signal Mt, and a turning-side drive circuit 55 that supplies drive electric power to the turning-side motor 32 based on the turning-side motor control signal Mt. The turning-side control unit 54 is connected to turning-side current sensors 46 that detect current values of the turning-side motor 32 corresponding to respective phases Iut, Ivt, Iwt that flow through connection lines 56 between the turning-side drive circuit 55 and motor coils of the turning-side motor 32 corresponding to the respective phases. The turning-side current sensors 46 acquire, as electric currents, voltage drops in shunt resistors, which are connected to the source sides of respective switching elements in an unillustrated inverter provided corresponding to the turning-side motor 32. In FIG. 2, for convenience of description, the connection lines 56 corresponding to the respective phases and the turning-side current sensors 46 corresponding to the respective phases are each illustrated as a single component. As the steering-side drive circuit 52 and the turning-side drive circuit 55 of the present embodiment, well-known PWM inverters including a plurality of switching elements, such as FETs, are adopted. The steering-side motor control signal Ms and the turning-side motor control signal Mt are each a gate on-off signal that defines on-off states of the switching elements.

The steering-side control unit 51 outputs the steering-side motor control signal Ms to the steering-side drive circuit 52 so as to control driving of the steering-side motor 13 through supply of the drive electric power from an in-vehicle electric power source B to the steering-side motor 13. The turning-side control unit 54 outputs the turning-side motor control signal Mt to the turning-side drive circuit 55 so as to control driving of the turning-side motor 32 through supply of the drive electric power from the in-vehicle electric power source B to the turning-side motor 32.

Description is now given of the function of the steering-side control unit 51. The steering-side control unit 51 receives the input of the steering torque Th, the vehicle speed value V, the steering-side rotation angle θs, the current values of respective phases Ius, Ivs, Iws, a below-described actual current value Iqt, and a below-described turning angle θp. The steering-side control unit 51 generates and outputs the steering-side motor control signal Ms based on each of these input state quantities. The actual current value Iqt is calculated based on the current values of respective phases Iut, Ivt, Iwt. The turning angle θp is calculated based on the turning-side rotation angle θt.

Specifically, the steering-side control unit 51 includes a steering angle calculator 61 that calculates a steering angle θh that is the rotation angle of the steering wheel 3, i.e., the steering shaft 11, a target reaction force torque calculator 62 that calculates a target reaction force torque Ts* as a target torque used as a target value of the steering reaction force, and a steering-side motor control signal calculator 63 that calculates the steering-side motor control signal Ms.

The steering angle calculator 61 receives the input of the steering-side rotation angle θs. The steering angle calculator 61 converts the steering-side rotation angle θs into an integrated angle including the range over 360° by, for example, counting the number of rotations of the steering-side motor 13 from a steering neutral position that is the position of the steering wheel 3 when the vehicle travels straight. The steering angle calculator 61 multiplies the integrated angle obtained through conversion by a conversion coefficient that is based on a rotation speed ratio of the speed reducer 14 to calculate a steering angle θh. The thus-obtained steering angle θh is output to the target reaction force torque calculator 62.

The target reaction force torque calculator 62 receives the input of the steering torque Th, the vehicle speed value V, the steering angle θh, and the actual current value Iqt. The target reaction force torque calculator 62 calculates a target reaction force torque Ts* based on the input state quantities. The thus-obtained target reaction force torque Ts* is output to the steering-side motor control signal calculator 63. The target reaction force torque calculator 62 also calculates, in the process of calculating the target reaction force torque Ts*, a target steering angle θh* that is a target value of the steering angle θh of the steering wheel 3. The thus-obtained target steering angle θh* is output to the turning-side control unit 54. In the present embodiment, the target reaction force torque calculator 62 is an example of the torque command value calculator, and the target reaction force torque Ts* is an example of the torque command value.

The steering-side motor control signal calculator 63 receives, in addition to the input of the target reaction force torque Ts*, the input of the steering-side rotation angle θs, and the current values of respective phases Ius, Ivs, Iws. The steering-side motor control signal calculator 63 calculates, based on the target reaction force torque Ts*, a d-axis target current value Ids* on a d-axis and a q-axis target current value Iqs* on a q-axis in a dq coordinate system. The target current values Ids*, Iqs* indicate a target current value on the d-axis and a target current value on the q-axis in the dq coordinate system, respectively. Specifically, the steering-side motor control signal calculator 63 calculates the q-axis target current value Iqs* that has a larger absolute value as the absolute value of the target reaction force torque Ts* becomes larger. In the present embodiment, the d-axis target current value Ids* on the d-axis is basically set to zero. The steering-side motor control signal calculator 63 then executes current feedback control in the dq coordinate system to generate the steering-side motor control signal Ms to be output to the steering-side drive circuit 52. In the following description, the term "feedback" may be written as "FB".

Specifically, based on the steering-side rotation angle θs, the steering-side motor control signal calculator 63 maps the actual current value Iqs on the dq coordinates to calculate a d-axis actual current value Ids and a q-axis actual current value Iqs that are actual current values of the steering-side motor 13 in the dq coordinate system. The steering-side motor control signal calculator 63 calculates a target voltage value based on a deviation of the currents on the d-axis and the q-axis so as to allow the d-axis actual current value Ids to follow the d-axis target actual current value Ids* and to allow the q-axis actual current value Iqs to follow the q-axis target actual current value Iqs*, and generates the steering-side motor control signal Ms for setting a duty ratio based on the calculated target voltage value. The thus-obtained steering-side motor control signal Ms is output to the steering-side drive circuit 52. As a result, the steering-side motor 13 receives supply of the drive electric power corresponding to the steering-side motor control signal Ms from the steering-side drive circuit 52. Then, the steering-side motor 13 applies the steering reaction force expressed as the target reaction force torque Ts* to the steering wheel 3.

Description is now given of the function of the turning-side control unit 54. The turning-side control unit 54 receives the input of the turning-side rotation angle θt, the target steering angle θh*, and the current values of respective phases Iut, Ivt, Iwt. The turning-side control unit 54 generates and outputs the turning-side motor control signal Mt based on each of these input state quantities. In the steering device 1 of the present embodiment, a steering angle ratio, which is a ratio between the steering angle θh and the turning angle θp, is constantly set to the ratio of 1:1, and the target turning angle used as a target value of the turning angle θp is equal to the target steering angle θh*.

Specifically, the turning-side control unit 54 includes a turning angle calculator 71 that calculates a turning angle θp that is the rotation angle of the pinion shaft 21, a target turning torque calculator 72 that calculates a target turning torque Tt* used as a target value of the turning force for turning the turning wheels 5, and a turning-side motor control signal calculator 73 that calculates the turning-side motor control signal Mt.

The turning angle calculator 71 receives the input of the turning-side rotation angle θt of the turning-side motor 32. The turning angle calculator 71 converts the input turning-side rotation angle θt to an integrated angle including the range over 360° by, for example, counting the number of rotations of the turning-side motor 32 from a rack neutral position that is the position of the rack shaft 22 when the vehicle travels straight. The turning angle calculator 71 multiplies the integrated angle obtained through conversion by a conversion coefficient that is based on a reduction ratio of the belt mechanism 33, a lead of the ball screw mechanism 34, and a rotation speed ratio of the rack and pinion mechanism 24, to calculate the turning angle θp. The thus-obtained turning angle θp is output to the target turning torque calculator 72.

The target turning torque calculator 72 receives the input of the target steering angle θh* and the turning angle θp. The target turning torque calculator 72 executes angle FB calculation for allowing the turning angle θp to follow the target steering angle θh* to calculate the target turning torque Tt*. Specifically, the target turning torque calculator 72 includes a turning angle FB control unit 74 that performs the angle FB calculation. The turning angle FB control unit 74 receives the input of an angle deviation Δθp that is obtained, through a subtractor 75, by subtracting the turning angle θp from the target steering angle θh* that is the target turning angle. The target turning torque calculator 72 calculates as the target turning torque Tt* a sum of output values of a proportional element, an integration element, and a derivative element where the angle deviation Δθp is used as an input. The thus-obtained target turning torque Tt* is output to the turning-side motor control signal calculator 73.

The turning-side motor control signal calculator 73 receives, in addition to the input of the target turning torque Tt*, the input of the turning-side rotation angle θt, and the current values of respective phases Iut, Ivt, Iwt. The turning-side motor control signal calculator 73 calculates, based on the target turning torque Tt*, a d-axis target current value Idt* on the d-axis and a q-axis target current value Iqt* on the q-axis in the dq coordinate system. Specifically, the turning-side motor control signal calculator 73 calculates the q-axis target current value Iqt* that has a larger absolute value as the absolute value of the target turning torque Tt* becomes larger. In the present embodiment, the d-axis target current value Idt* on the d-axis is basically set to zero. The turning-side motor control signal calculator 73 executes current FB calculation in the dq coordinate system to generate the turning-side motor control signal Mt to be output to the turning-side drive circuit 55, like the steering-side motor control signal calculator 63. The actual current value Iqt obtained in the process of generating the turning-side motor control signal Mt through calculation in the turning-side motor control signal calculator 73 is output to the target reaction force torque calculator 62 of the steering-side control unit 51. The thus-obtained turning-side motor control signal Mt is output to the turning-side drive circuit 55. As a result, the turning-side motor 32 receives supply of the drive electric power corresponding to the turning-side motor control signal Mt from the turning-side drive circuit 55. Then, the turning-side motor 32 applies the turning force expressed as the target turning torque Tt* to the turning wheels 5.

Figure 3:
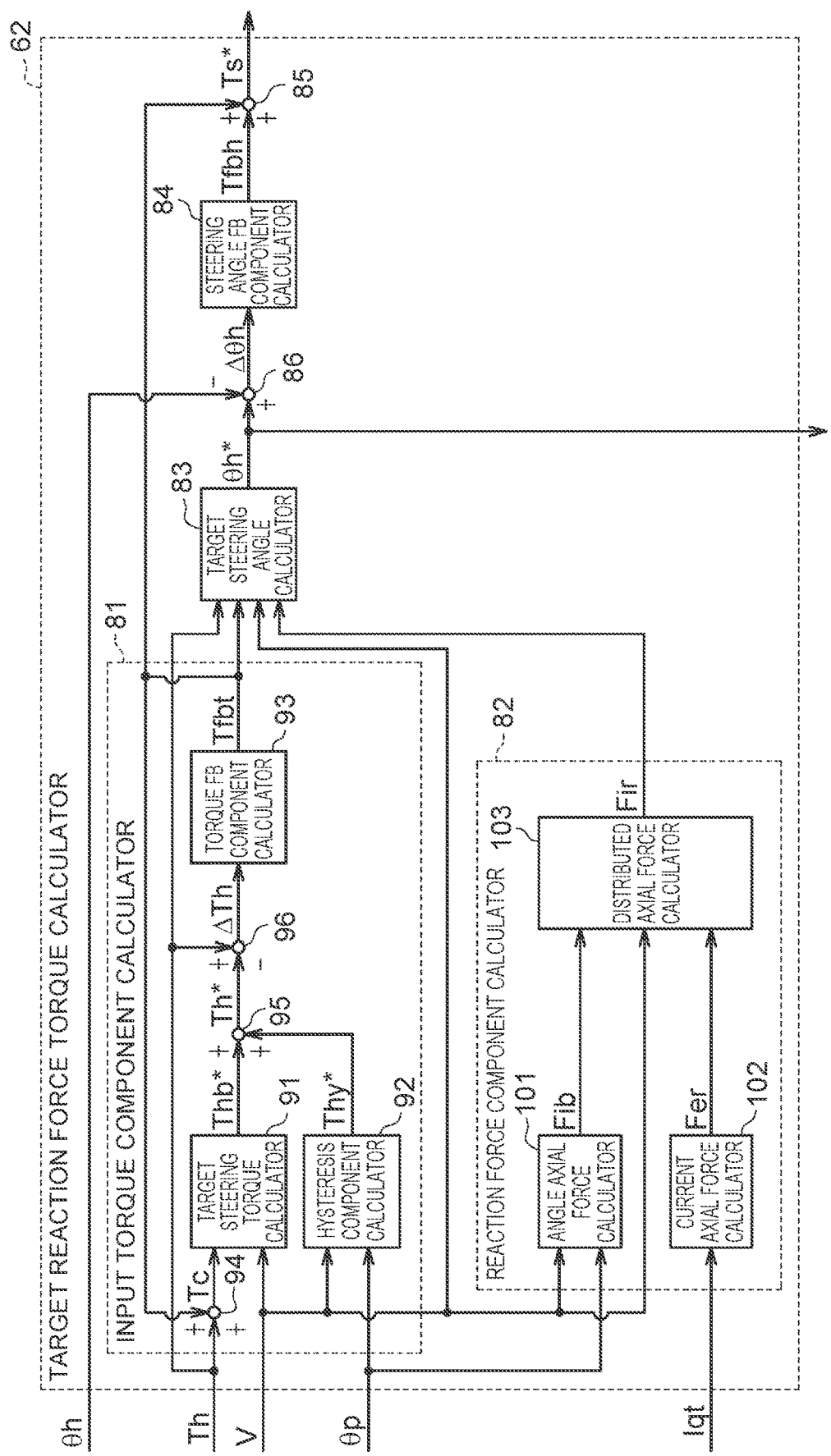
FIG. 3 is a block diagram showing the function of a target reaction force torque calculator of the first embodiment.

Description is now given of the function of the target reaction force torque calculator 62. As shown in FIG. 3, the target reaction force torque calculator 62 includes an input torque component calculator 81 that calculates a torque FB component Tfbt as an input torque component that is the force for rotating the steering wheel 3 in the direction of steering by the driver. The target reaction force torque calculator 62 also includes a reaction force component calculator 82 that calculates a force which resists rotation of the steering wheel 3 steered by the driver, i.e., a distributed axial force Fir which is the axial force acting on the rack shaft 22 from the turning wheels 5. The target reaction force torque calculator 62 also includes a target steering angle calculator 83 that calculates the target steering angle θh*, and a steering angle FB component calculator 84 that calculates a steering angle FB component Tfbh.

Specifically, the input torque component calculator 81 includes a target steering torque calculator 91 that calculates a target steering torque Thb* used as a target value of the steering torque Th to be input into the steering wheel 3, and a hysteresis component calculator 92 that calculates a hysteresis component Thy* that is added such that the target steering torque Thb* has hysteresis characteristics and changes accordingly. The input torque component calculator 81 also includes a torque FB component calculator 93 that calculates the torque FB component Tfbt by execution of the torque FB calculation.

The target steering torque calculator 91 receives the input of a driving torque Tc obtained by adding the torque FB component Tfbt to the steering torque Th through an adder 94. The target steering torque calculator 91 calculates a target steering torque Thb* that has a larger absolute value as the absolute value of the driving torque Tc becomes larger. The driving torque Tc is the torque used for turning the turning wheels 5 in the configuration where the steering mechanism 4 and the turning mechanism 6 are mechanically coupled with each other. The driving torque Tc indicates the force which approximately balances with the axial force acting on the rack shaft 22. In short, the driving torque Tc corresponds to an estimated and calculated axial force that acts on the rack shaft 22.

The hysteresis component calculator 92 receives the input of the turning angle θp and the vehicle speed value V. The hysteresis component calculator 92 calculates the hysteresis component Thy* based on the turning angle θp and the vehicle speed value V. A specific method of calculating the hysteresis component Thy* will be described later in detail. The thus-obtained hysteresis component Thy* is added to the target steering torque Thb* and is output to a subtractor 96 as a target steering torque Th* obtained through an adder 95. The thus-obtained target steering torque Th* is further subtracted from the steering torque Th and is output to the torque FB component calculator 93 as a torque deviation ΔTh obtained through the subtractor 96.

The torque FB component calculator 93 receives the input of the torque deviation ΔTh. Based on the torque deviation ΔTh, the torque FB component calculator 93 performs torque FB calculation, i.e., torque feedback control, for allowing the steering torque Th to follow the target steering torque Th* to calculate the torque FB component Tfbt. The torque FB component calculator 93 calculates as the torque FB component Tfbt a sum of output values of a proportional element, an integration element, and a derivative element where the torque deviation ΔTh is used as an input. The thus-obtained torque FB component Tfbt is output to the adder 94 and the target steering angle calculator 83. The torque FB component Tfbt is also output to a later-described adder 85.

The reaction force component calculator 82 includes an angle axial force calculator 101 that calculates an axial force acting on the turning wheels 5, i.e., an angle axial force Fib which is an ideal value of transmission force that is transmitted to the turning wheels 5, and a current axial force calculator 102 that calculates the axial force acting on the turning wheels 5, i.e., a current axial force Fer which is an estimate of the transmission force transmitted to the turning wheels 5. The reaction force component calculator 82 includes a distributed axial force calculator 103 that calculates a distributed axial force Fir corresponding to an estimated and calculated axial force acting on the rack shaft 22 which is obtained by adding the angle axial force Fib and the current axial force Fer at a prescribed distribution rate. In the present embodiment, the angle axial force Fib is calculated as an ideal value of the axial force defined by an optionally set vehicle model. The angle axial force Fib is calculated as the axial force not reflecting road surface information such as minute unevenness which does not influence the behavior of the vehicle in a transverse direction, and level difference which influences the behavior of the vehicle in the transverse direction. The current axial force Fer is calculated as an estimate of the axial force that actually acts when the vehicle travels or stops, and calculated as the axial force reflecting the road surface information. Each of the axial forces Fib, Fer are calculated by a unit of torque (N·m).

The angle axial force calculator 101 receives the input of the turning angle θp and the vehicle speed value V. The angle axial force calculator 101 calculates, based on the turning angle θp, the angle axial force Fib that has a larger absolute value as the absolute value of the turning angle θp becomes larger. The angle axial force calculator 101 also calculates the angle axial force Fib that has a larger absolute value as the vehicle speed value V becomes larger. The thus-obtained angle axial force Fib is output to the distributed axial force calculator 103.

The current axial force calculator 102 receives the input of the actual current value Iqt. The current axial force calculator 102 calculates, based on the actual current value Iqt, the current axial force Fer that has a larger absolute value, as the absolute value of the actual current value Iqt becomes larger. The thus-obtained current axial force Fer is output to the distributed axial force calculator 103.

The distributed axial force calculator 103 receives the input of the angle axial force Fib, the current axial force Fer, and the vehicle speed value V. The distributed axial force calculator 103 adds the angle axial force Fib and the current axial force Fer together to calculate the distributed axial force Fir, while adjusting, based on the vehicle speed value V, a distribution rate of the angle axial force Fib to be smaller and the distribution rate of the current axial force Fer to be larger as the vehicle speed value V becomes larger.

The target steering angle calculator 83 receives the input of the vehicle speed value V, the steering torque Th, the torque FB component Tfbt, and the distributed axial force Fir. The target steering angle calculator 83 calculates the target steering angle θh* using a steering model expression that is Expression (1) shown below. Expression (1) associates an input torque Tin* and the target steering angle θh*, the input torque Tin* being obtained by adding the steering torque Th to and subtracting the distributed axial force Fir from the torque FB component Tfbt.

$$\text{Tin}^* = C \cdot \theta h^{*\prime} + J \cdot \theta h^{*\prime\prime} \tag{1}$$

The model expression defines and expresses the relationship between the torque and the rotation angle of the rotary shaft that rotates in relation to the rotation of the steering wheel 3 in the configuration where the steering wheel 3 and the turning wheels 5 are mechanically coupled with each other, i.e., the configuration where the steering mechanism 4 and the turning mechanism 6 are mechanically coupled. The model expression is expressed with use of a viscosity coefficient C that models friction of the steering device 1, or the like, and an inertia coefficient J that models the inertia of the steering device 1. The viscosity coefficient C and the inertia coefficient J are variably set in accordance with the vehicle speed value V. The thus-obtained target steering angle θh* is output to the target turning torque calculator 72 and the steering angle FB component calculator 84.

The steering angle FB component calculator 84 receives the input of an angle deviation Δθp that is obtained by subtracting the steering angle θh from the target steering angle θh* through the subtractor 86. The steering angle FB component calculator 84 calculates the steering angle FB component Tfbh by performing angle FB calculation for allowing the steering angle θh to follow the target steering angle θh* based on the angle deviation Δθh. Specifically, the steering angle FB component calculator 84 calculates as the steering angle FB component Tfbh a sum of output values of a proportional element, an integration element, and a derivative element where the angle deviation Δθh is used as an input. The thus-obtained steering angle FB component Tfbh is added to the torque FB component Tfbt and is output to the steering-side motor control signal calculator 63 as the target reaction force torque Ts* obtained through the adder 85.

In the present embodiment, the target reaction force torque calculator 62 calculates the target steering torque Th* used for the torque FB calculation based on the driving torque Tc that is a calculated axial force. The target reaction force torque calculator 62 also calculates the target steering angle θh* used for the angle FB calculation based on the distributed axial force Fir that is a calculated axial force, and adds the target steering torque Th* and the target steering angle θh* together to obtain a target reaction force torque Ts*. Accordingly, the steering reaction force applied by the steering-side motor 13 basically acts as the force resisting the steering of the driver. However, the steering reaction force may also act as the force for assisting the steering of the driver depending on the deviation between the calculated axial force acting on the rack shaft 22 and the actual axial force.

Figure 4:
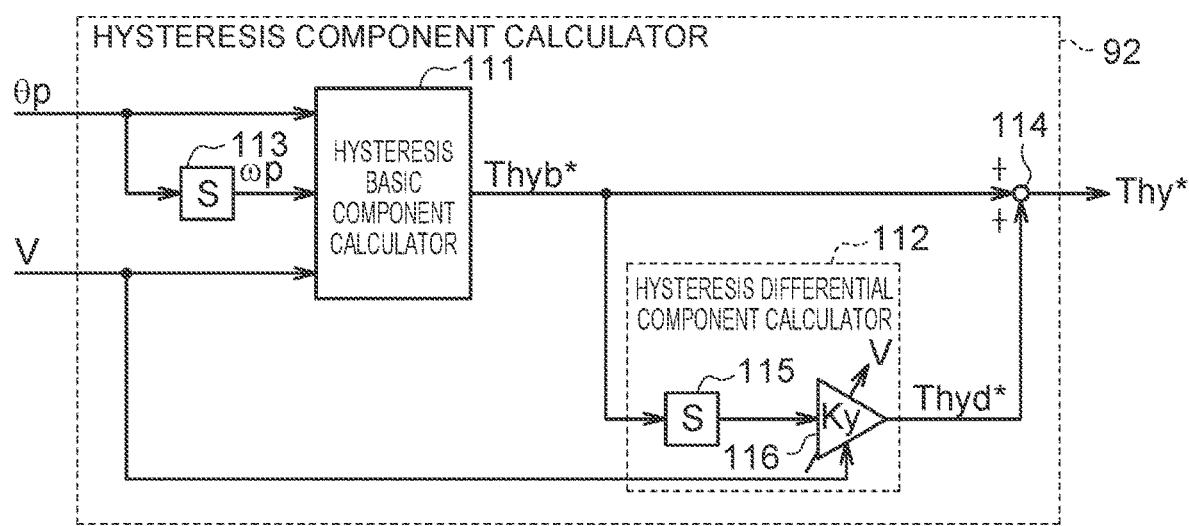
FIG. 4 is a block diagram showing the function of a hysteresis component calculator of the first embodiment.

Here, the function of the hysteresis component calculator 92 is described more in detail. As shown in FIG. 4, the hysteresis component calculator 92 includes a hysteresis basic component calculator 111 that calculates a hysteresis basic component Thyb* that is a basic component of the hysteresis component Thy*, and a hysteresis differential component calculator 112 that calculates a hysteresis differential component Thyd* that is a differential value of the hysteresis basic component Thyb*.

The hysteresis basic component calculator 111 receives the input of the vehicle speed value V, the turning angle θp, and an angular speed ωp. The angular speed ωp is a differential value obtained by differentiating the turning angle θp through the differentiator 113. The angular speed ωp is a change amount of the turning angle θp of the pinion shaft 21 which rotates in relation to steering of the steering wheel 3.

Figure 5A:
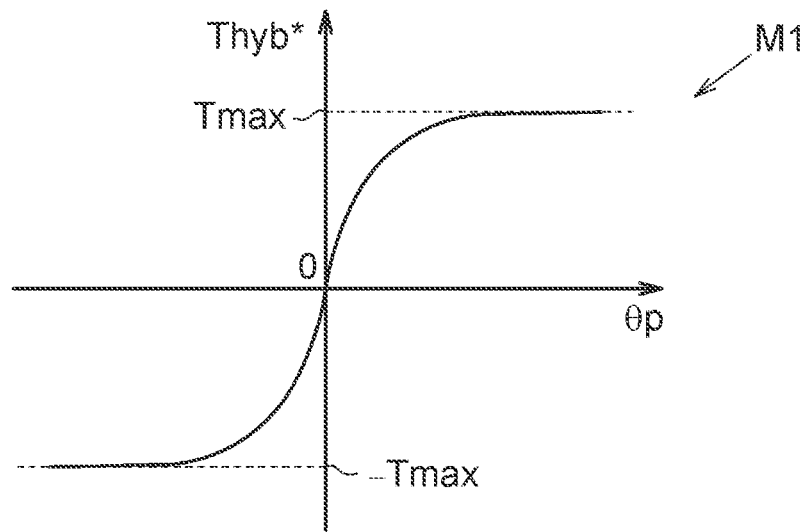
FIG. 5A is a graph showing the relationship between a turning angle and a hysteresis basic component at the time of turn steering.
Figure 5B:
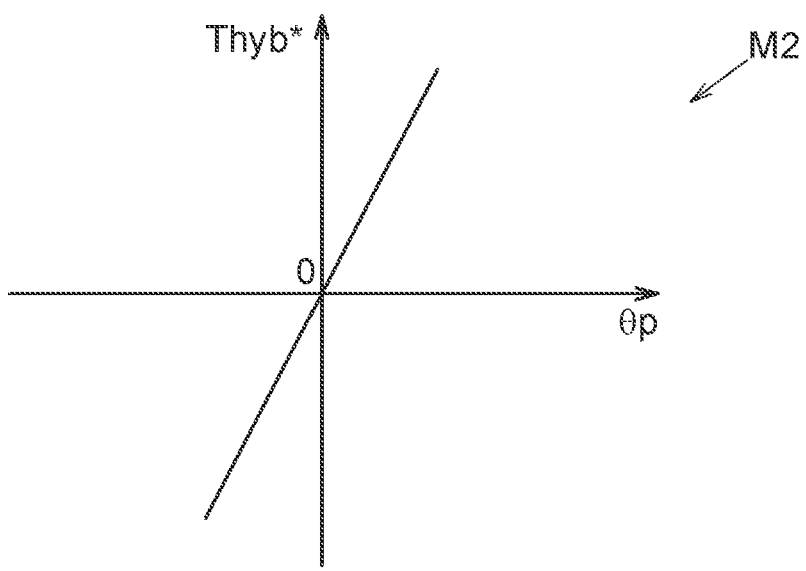
FIG. 5B is a graph showing the relationship between the turning angle and the hysteresis basic component at the time of return steering.

As shown in FIGS. 5A and 5B, the hysteresis basic component calculator 111 includes hysteresis maps M1, M2 which define the relationship between the turning angle θp and the hysteresis basic component Thyb*. The hysteresis basic component calculator 111 performs calculation of the hysteresis basic component Thyb* using the turning angle θp as an input. The hysteresis basic component calculator 111 performs the map calculation of the hysteresis basic component Thyb* using one of the hysteresis maps M1, M2 according to whether steering is turn steering or return steering that is determined based on the signs or changes of the turning angle θp and the angular speed ωp. In the present embodiment, the turn steering is the steering that is continuously performed in one identical direction, whereas the return steering is the steering that is performed only while the turning angle θp is in a small prescribed range after the direction of steering has changed. In the hysteresis maps M1, M2, the term "θp" represents a change amount of the turning angle θp with use of the turning angle θp at the start position of the turn steering or return steering as an origin.

Specifically, the hysteresis basic component calculator 111 calculates the hysteresis basic component Thyb* using the hysteresis map M1 in turn steering. In this case, the hysteresis basic component Thyb* is calculated such that the absolute value of the hysteresis basic component Thyb* becomes larger and the absolute value of a hysteresis gradient becomes smaller, as the absolute value of the turning angle θp becomes larger. The hysteresis gradient is an amount of change of the hysteresis basic component Thyb* with respect to the turning angle θp at the rising edge of the hysteresis basic component Thyb*. The absolute value of hysteresis basic component Thyb* in this case saturates when the turning angle θp is in a prescribed range or more. The value at the time is calculated to be a maximum value Tmax or more.

In performing turn steering to the right, the hysteresis basic component calculator 111 uses a value shown in a first quadrant of the hysteresis map M1 with the turning angle θp at the start position of the turn steering as an origin. In turn steering to the left, the hysteresis basic component calculator 111 uses a value shown in a third quadrant of the hysteresis map M1 with the turning angle θp at the start position of the turn steering as an origin.

Meanwhile, in the return steering, the hysteresis basic component calculator 111 calculates the hysteresis basic component Thyb* using the hysteresis map M2. In this case, the hysteresis basic component Thyb* is calculated in proportion to the turning angle θp. The hysteresis basic component Thyb* in this case is calculated only when the turning angle θp is in a prescribed range from the origin.

In performing return steering to the right, the hysteresis basic component calculator 111 uses a value shown in the first quadrant of the hysteresis map M2 with the turning angle θp at the start position of the return steering as an origin, only while the turning angle θp is within the prescribed range from the origin. In performing return steering to the left, the hysteresis basic component calculator 111 uses a value shown in the third quadrant of the hysteresis map M2 with the turning angle θp at the start position of the return steering as an origin, only while the turning angle θp is within in the prescribed range from the origin.

In the present embodiment, the hysteresis maps M1, M2 are configured to change the hysteresis basic component Thyb* in accordance with the angular speed ωp, and also configured to change the hysteresis basic component Thyb* in accordance with the vehicle speed value V. The hysteresis maps M1, M2 change the hysteresis basic component Thyb* in accordance with the angular speed ωp or the vehicle speed value V for the purpose of implementing a desired steering feeling. In the present embodiment, for example, the hysteresis basic component Thyb* is changed such that as the angular speed ωp is larger, the hysteresis gradient is made smaller and the responsiveness is lowered. The hysteresis basic component Thyb* is also changed such that as the vehicle speed value V is smaller, the hysteresis gradient is made larger and the responsiveness is enhanced.

Figure 6:
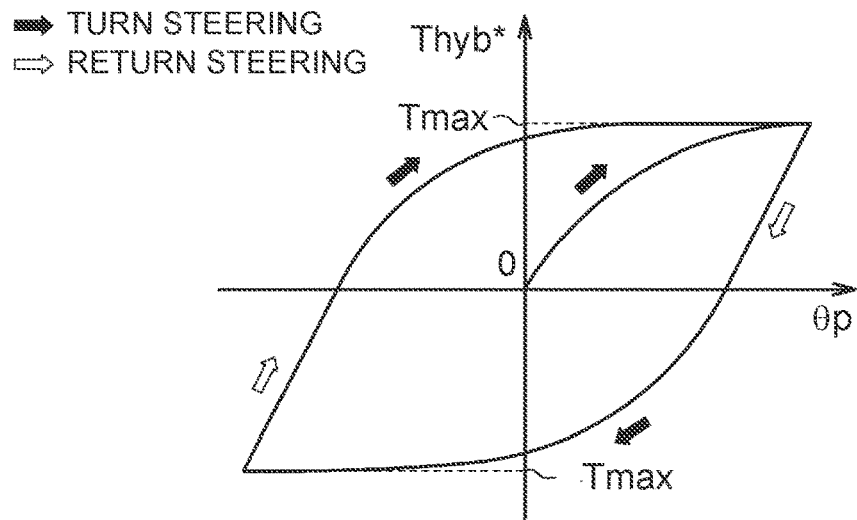
FIG. 6 is a graph showing the relationship between the turning angle and the hysteresis basic component in the case of sine steering.

Accordingly, as shown in FIG. 6, in the case of, for example, performing sine steering in which turn steering and return steering of the steering wheel 3 are periodically repeated with a constant frequency, the hysteresis basic component calculator 111 calculates the hysteresis basic component Thyb* having hysteresis characteristics with respect to change of the turning angle θp. The thus-obtained hysteresis basic component Thyb* is output to the hysteresis differential component calculator 112 and an adder 114. In the present embodiment, particularly the target steering torque calculator 91 of the input torque component calculator 81 is an example of the command value component calculator, the target steering torque Thb* is an example of the command value component, and the turning angle θp is an example of the state quantity that changes in accordance with the operation of the steering device 1.

The hysteresis differential component calculator 112 receives the input of the hysteresis basic component Thyb* and the vehicle speed value V. The hysteresis differential component calculator 112 multiplies a value, obtained through a differentiator 115 by differentiating the hysteresis basic component Thyb*, by a gain Ky corresponding to the vehicle speed value V to calculate the hysteresis differential component Thyd* that is a differential component of the hysteresis basic component Thyb* obtained through a multiplier 116. In the present embodiment, the hysteresis differential component Thyd* is calculated as a component that acts to restrain vibration response characteristics generated in the hysteresis basic component Thyb*.

In the present embodiment, due to the hysteresis basic component Thyb* being changed based on the vehicle speed value V, the hysteresis differential component Thyd* is changed based on the vehicle speed value V in the natural course of events. Meanwhile, the hysteresis differential component Thyd* is configured to be adjusted and changed to an appropriate component based on the gain Ky corresponding to the vehicle speed value V for the purpose of improving the steering feeling.

The thus-obtained hysteresis differential component Thyd* is added to the hysteresis basic component Thyb* and is output to the adder 95 as a hysteresis basic component Thy* obtained through the adder 114. In the present embodiment, through addition to the hysteresis basic component Thy*, the hysteresis differential component Thyd* is added as a component acting to restrain the vibration response characteristics generated in the hysteresis basic component Thyb*. Through addition to the target steering torque Th*, the hysteresis component Thy* is added as a component acting such that the target steering torque Th* has hysteresis characteristics and changes accordingly. In the present embodiment, considering that the hysteresis component Thy* is made to act to restrain the vibration response characteristics generated in the hysteresis basic component Thyb*, the same effect can be obtained even when the hysteresis differential component Thyd* is added through subtraction from the hysteresis basic component Thyb*.

Hereinafter, the action of the present embodiment will be described. In the present embodiment, by adding the hysteresis basic component Thyb*, it becomes possible to give a driver a response to steering.

Figure 7:
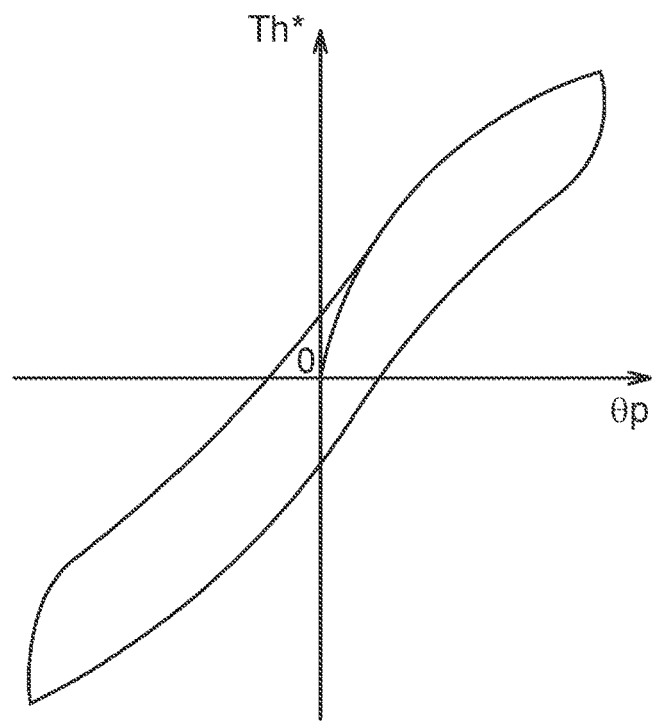
FIG. 7 is a graph showing the relationship between the turning angle and a target steering torque.

As shown in FIG. 7, when, for example, the sine steering is performed, the steering characteristics indicated by the relationship between the turning angle θp and target steering torque Th* come to show the characteristics of having the hysteresis characteristics based on the hysteresis basic component Thyb* and changing accordingly. Then, the hysteresis gradient that is a gradient at the rising edge of the hysteresis basic component Thyb* exerts influence to the occasions such as at the start of turn steering to the right from the origin where the turning angle θp is zero, and at the start of turn steering to the left after the return steering to the left that is subsequent to the turn steering to the right in particular.

In other words, in order to give a driver a noticeable response as the response to steering, it is conceivable to increase the hysteresis gradient of the hysteresis basic component Thyb*, and thereby enhance the responsiveness. In this case, when the hysteresis gradient is forcibly increased and thereby the responsiveness is excessively enhanced, vibration response characteristics become notable in the hysteresis basic component Thyb* due to such reasons as insufficient response performance, which is disadvantageous in respect of stability. In other words, increasing the hysteresis gradient of the hysteresis basic component Thyb* and enhancing the responsiveness for the purpose of giving a driver a noticeable response have limitations.

As a solution, in the present embodiment, the hysteresis differential component Thyd* acts to restrain the vibration response characteristics generated in the hysteresis basic component Thyb*. This means that it becomes possible to restrain the vibration response characteristics when the hysteresis gradient of the hysteresis basic component Thyb* is increased. Thus, it becomes possible to expand the limitations of the responsiveness that can be enhanced by increasing the hysteresis gradient of the hysteresis basic component Thyb* as compared with the case where the hysteresis differential component Thyb* is not added.

Figure 8:
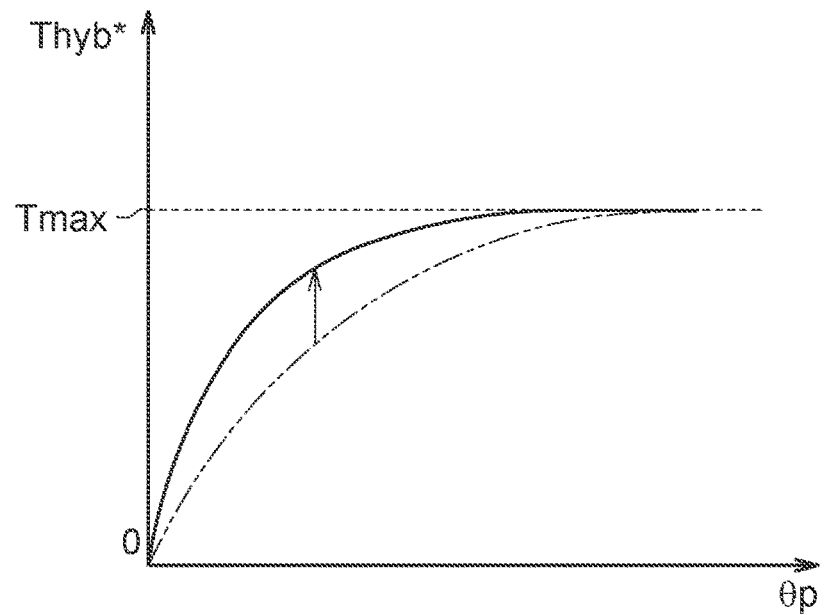
FIG. 8 is an enlarged view showing the relationship of a first quadrant of FIG. 5A in an enlarged state.

Specifically, FIG. 8 shows an expanded part of the first quadrant in the hysteresis map M1 shown in FIG. 5A. The first quadrant corresponds to the time of starting the turn steering to the right from the origin where the turning angle θp is zero. The absolute value of the hysteresis gradient of the hysteresis basic component Thyb* can be designed as shown by a solid line that is increased from an imaginary line as indicated by an arrow in the drawing. The same also applies to the absolute value of the hysteresis gradient of the hysteresis basic component Thyb* in the third quadrant corresponding to the time of starting the turn steering to the left from the origin where the turning angle θp is zero in the hysteresis map M1.

Figure 9:
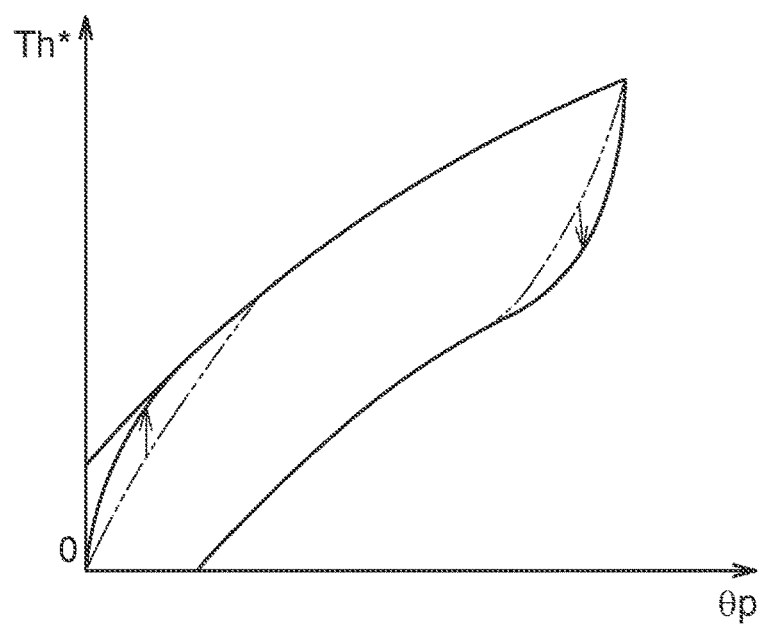
FIG. 9 is an enlarged view showing the relationship of a first quadrant of FIG. 7 in an enlarged state.

In this relation, FIG. 9 shows an expanded portion of the first quadrant corresponding to turn steering to the right from the origin where the turning angle θp having the steering characteristic shown in FIG. 7 is zero. The absolute value of the gradient of the target steering torque Th* with respect to change in the turning angle θp at the start of turning to the right can be changed as shown by a solid line that is increased from an imaginary line as shown by arrows in the drawing. As shown in FIG. 9, the absolute value of the gradient of the target steering torque Th* can be increased, as shown by arrows in the drawing, with respect to change of the turning angle θp at the start of the turn steering to the left after return steering is performed to the left.

Hereinafter, the effects of the present embodiment will be described. (1) In the present embodiment, when the hysteresis component Thy* is calculated, the hysteresis differential component Thyd* is added to the hysteresis basic component Thyb*. Therefore, in the present embodiment, as compared with the case where the hysteresis differential component Thyd* is not added, it becomes possible to design the hysteresis basic component Thyb* with a larger hysteresis gradient and enhanced responsiveness. As a result, a noticeable response can be given to a driver, and improvement in the steering feeling can be achieved.

(2) In the present embodiment, when the hysteresis basic component Thyb* is changed based on the angular speed ωp, the hysteresis basic component Thyb* is changed such that the hysteresis gradient is made smaller and the responsiveness is lowered, as the angular speed ωp is larger. This enables a driver to perform smooth steering operation with a steering response restrained in the case of a quick steering. Thus, a noticeable response can be given to the driver, or the driver can perform smooth steering operation, and an appropriate steering feeling corresponding to the steering state of the steering wheel 3 is set. Therefore, the present embodiment is effective for achieving improvement in the steering feeling.

(3) In the present embodiment, when the hysteresis basic component Thyb* is changed based on the vehicle speed value V, the hysteresis basic component Thyb* is changed such that the hysteresis gradient is made larger and the responsiveness is enhanced, as the vehicle speed value V is smaller. This makes it possible to give the driver a sufficient response at the time of stopping the vehicle. Thus, the driver is given a noticeable response or a sufficient response, and an appropriate steering feeling corresponding to the travel state of the vehicle is set. Therefore, the present embodiment is effective for achieving improvement in the steering feeling.

(4) Here, when the hysteresis basic component Thyb* is changed based on the vehicle speed value V, the hysteresis differential component, which is a component obtained by differentiating the hysteresis basic component Thyb*, is also changed based on the vehicle speed value V in the natural course of events. However, the hysteresis differential component changed based on the vehicle speed value V in the natural course of events is not necessarily appropriate for the purpose of improving the steering feeling.

Accordingly, in the present embodiment, when the hysteresis basic component Thyb* is changed based on the vehicle speed value V, the hysteresis differential component Thyd* is changed based on the vehicle speed value V. As a result, the hysteresis differential component Thyd* is adjusted to be an appropriate component in order to achieve improvement in the steering feeling. Thus, the present embodiment can contribute to improvement in the steering feeling.

Second Embodiment

Description is now given of a second embodiment of the steering controller. The component members similar to those in the embodiment described before are denoted by the similar signs to omit redundant description.

Figure 10:
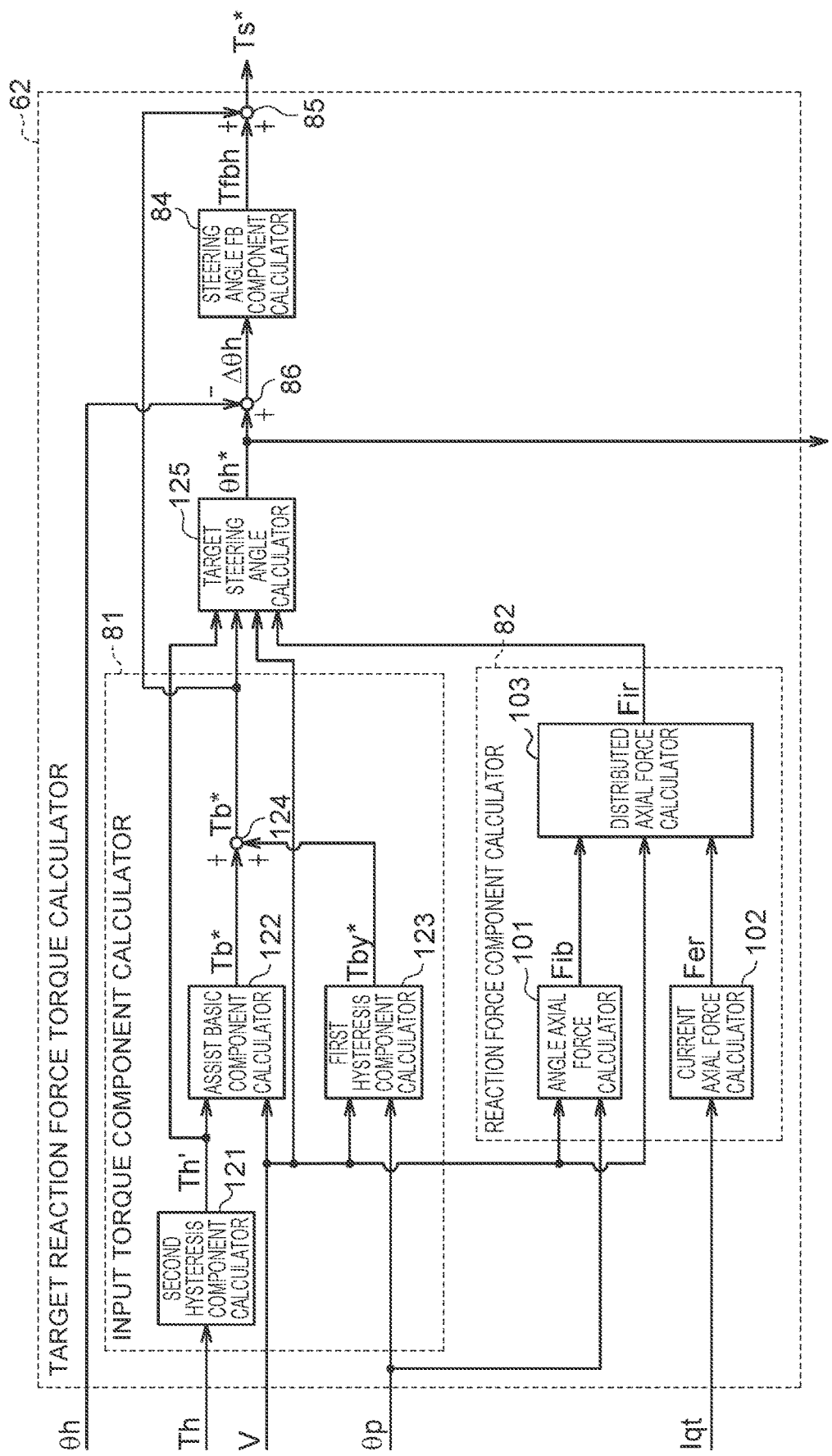
FIG. 10 is a block diagram showing the function of a target reaction force torque calculator of a second embodiment.

As shown in FIG. 10, the input torque component calculator 81 of the present embodiment includes an assist basic component calculator 122 that calculates an assist basic component Tb* used as a basic component of the motor torque to be output with respect to the steering torque Th that is input into the steering wheel 3. The input torque component calculator 81 also includes a first hysteresis component calculator 123 that calculates a first hysteresis component Tby* that is added such that the assist basic component Tb* has hysteresis characteristics and changes accordingly. The input torque component calculator 81 also includes a second hysteresis component calculator 121 that calculates a second hysteresis component, like the first hysteresis component Tby*, that is added such that the assist basic component Tb* has hysteresis characteristics and changes accordingly. In the present embodiment, particularly the assist basic component calculator 122 of the input torque component calculator 81 is an example of the command value component calculator, the assist steering torque Tb* is an example of the command value component, and the turning angle θp and the steering torque Th are examples of the state quantity that changes in accordance with the operation of the steering device 1.

The second hysteresis component calculator 121 receives the input of the steering torque Th and the turning angle θp. The second hysteresis component calculator 121 calculates an apparent steering torque Th' configured such that the absolute value of the steering torque Th becomes smaller than the actual value in order to provide a predetermined motor torque or more as the motor torque that is to be output with respect to the steering torque Th. The second hysteresis component calculator 121 basically calculates as the steering torque Th' an actual value of the absolute value of the steering torque Th, in the vicinity of a rack neutral position where the turning angle θp is zero. The second hysteresis component calculator 121 also calculates the steering torque Th' such that as the absolute value of the turning angle θp is larger, the absolute value of the steering torque Th becomes smaller than the actual value. The thus-obtained steering torque Th' is output to the assist basic component calculator 122 and a target steering angle calculator 125.

The second hysteresis component calculator 121 is similar in configuration to the hysteresis component calculator 92 of the first embodiment. In the second hysteresis component calculator 121, the turning angle θp is replaced with the steering torque Th, the hysteresis basic component Thyb* is replaced with the steering torque basic component Thb, and the hysteresis differential component Thyd* is replaced with a steering torque differential component Thd that is a value obtained by differentiating the steering torque basic component Thb. In the second hysteresis component calculator 121, the hysteresis component Thy* is replaced with the steering torque Th' obtained by adding the steering torque basic component Thb and the steering torque differential component Thd. The second hysteresis component calculator 121 includes maps with the vertical axis of the hysteresis maps M1, M2 shown in FIGS. 5A and 5B being changed to difference "ΔTh" that is used to set the absolute value of steering torque Th to be smaller than the actual value. The present embodiment is similar to the first embodiment in that the steering torque differential component Thd is added through subtraction from the steering torque basic component Thb.

The assist basic component calculator 122 receives the input of the steering torque Th' and the vehicle speed value V. The assist basic component calculator 122 calculates and generates the assist basic component Tb* based on the steering torque Th' and the vehicle speed value V. The assist basic component calculator 122 calculates the assist basic component Tb* that has a larger absolute value, as the absolute value of the steering torque Th' is larger and the vehicle speed value V is smaller. Specifically, in the present embodiment, the assist basic component Tb* is calculated through torque feedforward control of the steering torque Th. The thus-obtained assist basic component Tb* is output to an adder 124.

The first hysteresis component calculator 123 receives the input of the turning angle θp and the vehicle speed value V. The first hysteresis component calculator 123 calculates the first hysteresis component Tby* based on the turning angle θp and the vehicle speed value V. The thus-obtained first hysteresis component Tby* is added to the assist basic component Tb* and is output to the target steering angle calculator 125 as an assist component Tb*' obtained through the adder 124.

The first hysteresis component calculator 123 is similar in configuration to the hysteresis component calculator 92 of the first embodiment. The hysteresis basic component Thyb* is replaced with the first hysteresis basic component Tbyb*, and the hysteresis differential component Thyd* is replaced with a first hysteresis differential component Tbyd* that is a value obtained by differentiating the first hysteresis basic component Tbyb*. In the first hysteresis component calculator 123, the hysteresis component Thy* is replaced with the first hysteresis component Tby* obtained by adding the first hysteresis basic component Tbyb* and the first hysteresis differential component Tbyd*. The first hysteresis component calculator 123 includes maps with the vertical axis of the hysteresis maps M1, M2 shown in FIGS. 5A and 5B being changed to the first hysteresis basic component Tbyb*. The present embodiment is similar to the first embodiment in that the first hysteresis differential component Tbyd* may be added through subtraction from the first hysteresis basic component Tbyb*.

The target steering angle calculator 125 of the present embodiment receives the input of the vehicle speed value V, the steering torque Th', the assist component Tb*', and the distributed axial force Fir. The target steering angle calculator 125 calculates the target steering angle θh* using the steering model expression that is Expression (1) same as in the first embodiment. Expression (1) associates an input torque Tin*, obtained by adding the steering torque Th' to and subtracting the distributed axial force Fir from the assist component Tb*', and the target steering angle θh*. The thus-obtained target steering angle θh* is output to the target turning torque calculator 72 and the steering angle FB component calculator 84.

The present embodiment demonstrates the following effects, in addition to the functions and effects corresponding to the functions and effects of the first embodiment. (5) When torque feedforward control of the steering torque Th is adopted when calculating the assist basic component Tb* as in the present embodiment, the steering torque Th changes in the natural course of events unlike in the first embodiment which adopts the torque feedback control for controlling the steering torque Th to reach the target value. In this case, even when the first hysteresis component Tby* is added to the assist basic component Tb* to provide the hysteresis characteristics, the addition of the first hysteresis component Tby* may not be reflected on the entire range of the turning angle θp. For example, in some cases, the addition of the first hysteresis component Tby* is less reflected as the turning angle θp is farther away from the rack neutral position where the turning angle θp is zero. In the vicinity of the upper limit of the turning angle θp, the addition of the first hysteresis component Tby* may hardly be reflected. In that case, in the vicinity of the upper limit of the turning angle θp, the assist basic component Tb* almost has no hysteresis characteristics.

To cope with this situation, in the present embodiment, for the assist basic component Tb* to have the hysteresis characteristics over the entire range of the turning angle θp, the absolute value of the steering torque Th in the vicinity of the upper limit of the turning angle θp is replaced with the apparent steering torque Th' that is smaller than the actual value. As a consequence, in the vicinity of the upper limit of the turning angle θp, a smaller motor torque than the motor torque needed at the time is output. Accordingly, in order to turn the turning wheels 5, the driver needs to input the steering torque Th having a larger absolute value than the actual steering torque Th. In this case, the absolute value of the steering torque Th provided by the driver becomes larger, and as a result, the absolute value of the assist basic component Tb* becomes larger to increase motor torque output. Therefore, the assist basic component Tb* has the hysteresis characteristics even in the vicinity of the upper limit of the turning angle θp, which makes it possible to contribute to implementation of a desired steering feeling.

Third Embodiment

Description is now given of a third embodiment of the steering controller. The component members similar to those in the embodiments described before are denoted by the similar signs to omit redundant description.

Figure 11:
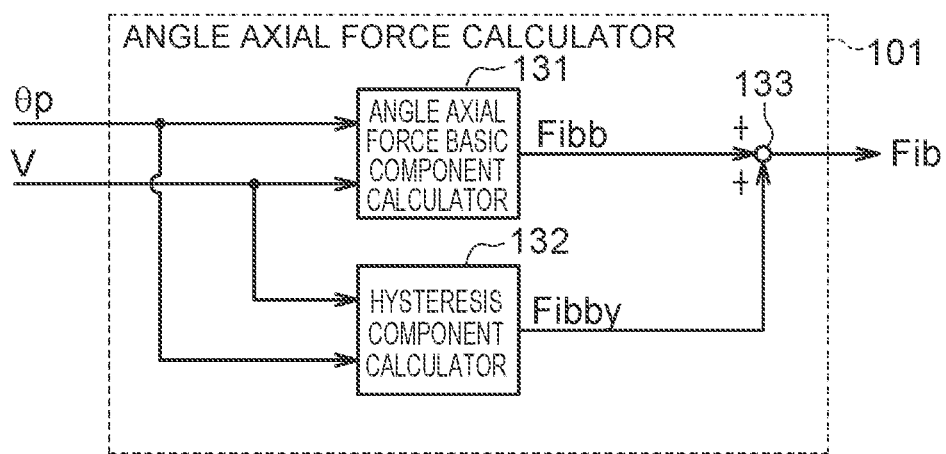
FIG. 11 is a block diagram showing the function of an angle axial force calculator of a third embodiment.

As shown in FIG. 11, the angle axial force calculator 101 of the present embodiment calculates an angle axial force Fib so as to have the hysteresis characteristics. Specifically, the angle axial force calculator 101 includes an angle axial force basic component calculator 131 that calculates an angle axial force basic component Fibb that is a basic component of the angle axial force Fib, and a hysteresis component calculator 132 that calculates a hysteresis component Fibby that is added such that the angle axial force Fib has hysteresis characteristics and changes accordingly. In the present embodiment, the angle axial force calculator 101 is an example of the command value component calculator, the angle axial force Fib is an example of the command value component, and the turning angle θp is an example of the state quantity that changes in accordance with the operation of the steering device 1.

The angle axial force basic component calculator 131 receives the input of the turning angle θp and the vehicle speed value V. The angle axial force basic component calculator 131 calculates the angle axial force Fib, calculated by the angle axial force calculator 101 of the first embodiment, as the angle axial force basic component Fibb. The thus-obtained angle axial force basic component Fibb is output to an adder 133.

The hysteresis component calculator 132 receives the input of the turning angle θp and the vehicle speed value V. The hysteresis component calculator 132 calculates the hysteresis component Fibby based on the turning angle θp and the vehicle speed value V. The thus-obtained hysteresis component Fibby is added to the angle axial force basic component Fibb and is output to the distributed axial force calculator 103 as the angle axial force Fib obtained through the adder 133.

The hysteresis component calculator 132 is similar in configuration to the hysteresis component calculator 92 of the first embodiment. The hysteresis basic component Thyb* is replaced with a hysteresis basic component Fibbyb, and the hysteresis differential component Thyd* is replaced with a hysteresis differential component Fibbyd that is a value obtained by differentiating the hysteresis basic component Fibbyb. In the hysteresis component calculator 132, the hysteresis component Thy* is replaced with the hysteresis component Fibby obtained by adding the hysteresis basic component Fibbyb and the hysteresis differential component Fibbyd. The hysteresis component calculator 132 includes maps with the vertical axis of the hysteresis maps M1, M2 shown in FIGS. 5A and 5B being changed to the hysteresis basic component Fibbyb. The present embodiment is similar to the first embodiment in that the hysteresis differential component Fibbyd may be added through subtraction from the hysteresis basic component Fibbyb. The present embodiment is not limitedly configured and applied by changing the configuration of the angle axial force calculator 101 of the first embodiment. The present embodiment may also be configured and applied by changing the configuration of the angle axial force calculator 101 of the second embodiment.

The present embodiment demonstrates the functions and effects corresponding to the functions and effects of the first embodiment. Each of the embodiments may be changed as follows. Other embodiments shown below can be combined with each other without departing from the range of technically consistency.

In the first embodiment, the hysteresis differential component Thyd* may not be changed based on the vehicle speed value V. This also applies to the differential component corresponding to the hysteresis differential component Thyd* in the second and third embodiments.

In the first embodiment, the aspect of changing the hysteresis basic component Thyb* based on the vehicle speed value V may appropriately be modified such that the hysteresis gradient is made smaller and the responsiveness is made lower, as the vehicle speed value V is smaller, for example. The same also applies to the basic component corresponding to the hysteresis basic component Thyb* in the second and third embodiments.

In the first embodiment, the aspect of changing the hysteresis basic component Thyb* based on the angular speed ωp may appropriately be modified such that the hysteresis gradient is made larger and the responsiveness is made higher, as the angular speed ωp is larger, for example. This also applies to the basic component corresponding to the hysteresis basic component Thyb* in the second and third embodiments.

In the first embodiment, the hysteresis basic component Thyb* may be changed based on an angular acceleration αp instead of the angular speed ωp. This also applies to the basic component corresponding to the hysteresis basic component Thyb* in the second and third embodiments.

In the first embodiment, when the hysteresis differential component Thyd* is calculated, the method of differentiation may be replaced with, for example, a method in which a change amount of the hysteresis basic component Thyb* is calculated and used as a differential component, or a method in which a phase advance filter is used to perform filter processing and a result thereof is used as a differential component.

In the first embodiment, the turning angle θp is used for calculation of various components. However, the various components may be calculated based on any state quantity correlated with the turning angle θp, i.e., the steering angle of the turning wheels 5. Examples of the state quantity correlated with the steering angle of the turning wheels 5 include the target steering angle θh*, i.e., the target turning angle, the steering angle θh, the steering-side rotation angle θs, and the turning-side rotation angle θt. These state quantities are also examples of the state quantities which change in accordance with the operation of the steering device 1. Specifically, the hysteresis basic component Thyb* and the angle axial force Fib may be calculated based on, for example, the target steering angle θh*. This modification can also provide the same effects as the first embodiment. This is also true in the second and third embodiments.

In the first embodiment, a control configuration may be constructed such that the torque FB component Tfbt is equal to the target reaction force torque Ts*. The control configuration may also be constructed such that the steering angle FB component not added with the torque FB component Tfbt is equal to the target reaction force torque Ts*.

In the first embodiment, when the target steering torque Thb* is calculated in the target steering torque calculator 91, at least the steering torque Th may be used, and the vehicle speed value may be omitted, or other elements may be used in combination. This is also the same in the case where the assist basic component Tb* is calculated in the second embodiment. In this case, at least the steering torque Th' may be used, and the vehicle speed value V may be omitted, or other elements may be used in combination.

In the first embodiment, when the hysteresis basic component calculator 111 calculates the hysteresis basic component Thyb* in the hysteresis component calculator 92, at least the turning angle θp may be used, and the vehicle speed value V and the angular speed ωp may be omitted, or other elements may be used in combination. When the hysteresis differential component calculator 112 calculates the hysteresis differential component Thyd*, at least the hysteresis basic component Thyb* may be used, and the vehicle speed value V may be omitted, or other elements may be used in combination. This is also the same in the case of calculating the components corresponding to the various components in the second and third embodiments.

In the first embodiment, when the hysteresis component Thy* is calculated in the hysteresis component calculator 92, the hysteresis differential component Thyd* may be added to the hysteresis basic component Thyb* only during end-side steering in the turn steering, the end-side steering being performed in the direction of separating from the rack neutral position where the turning angle θp is zero. In this case, the hysteresis basic component calculator 111 or the hysteresis differential component calculator 112 may determine whether or not the end-side steering is in operation based on the steering torque Th or the like, or an additional calculator is provided to perform the determination. In this example, unlike the case shown in FIG. 9, it is difficult to increase the absolute value of the gradient of the target steering torque Th*, as shown by the arrows in the drawing, with respect to the change of the turning angle θp at the start of the turn steering to the left after return steering is performed to the left. However, in terms of improving the steering feeling, a sufficient effect is provided. This is also true in the calculator corresponding to the hysteresis component calculator 92 in the second and third embodiments.

In the first embodiment, when the angle axial force Fib is calculated in the angle axial force calculator 101, at least the turning angle θp may be used, and the vehicle speed value V may be omitted, or other elements may be used in combination. The same also applies to the case where the current axial force calculator 102 calculates the current axial force Fer, and the case where the distributed axial force calculator 103 calculates the distributed axial force Fir. The same also applies to the case of the third embodiment in which the angle axial force basic component calculator 131 in the angle axial force calculator 101 calculates the angle axial force basic component Fibb.

In the second embodiment, when at least the configuration of the first hysteresis component calculator 123 is provided, the configuration of the second hysteresis component calculator 121 may be eliminated. Even in such a case, the functions and effects corresponding to the functions and effects of the first embodiment can be demonstrated.

In each of the embodiments, the steering angle ratio between the steering angle θh and the turning angle θp is set to be constant. However, the steering angle ratio may be variable depending on the vehicle speed value V, the turning angle θp, or the like. In this case, the target steering angle θh* and the target turning angle take different values.

In each of the embodiments, the target steering angle θh* may be calculated with use of, instead of Expression (1), a model expression that uses a spring coefficient K determined based on the specifications of a suspension or wheel alignment of the vehicle, the model expression being modeled by adding so-called a spring term.

In each of the embodiments, a turning-side actuator configured such that the turning-side motor 32 is disposed on a co-axis of the rack shaft 22 or such that the turning-side motor 32 is coupled with the rack shaft 22 through the worm reducer and the rack and pinion mechanism may be adopted as the turning-side actuator 31.

In each of the embodiments, the CPU constituting the steering controller 2 may be implemented as one or more processors that execute computer programs, one or more dedicated hardware circuits such as application-specific integrated circuits that execute at least some of the various processes, or a circuit including a combination of the processor and the dedicated hardware circuit. The memory may be constituted of any available media that can be accessed by general purpose computers or dedicated computers.

In each of the embodiments, the steering device 1 has the linkless structure in which the steering mechanism 4 and the turning mechanism 6 are mechanically separated all the time. However, without being limited to this, the steering device 1 may have a structure in which the steering mechanism 4 and the turning mechanisms 6 can mechanically be separated by a clutch. The steering device 1 may be configured as an electric power steering device that applies assist force that is the force for assisting steering of the steering wheel 3. In this case, the steering wheel 3 is mechanically connected to the pinion shaft 21 through the steering shaft 11.

Next, the technical ideas which can be recognized from each of the embodiments and modifications will additionally be described below. The command value component calculator calculates the target steering torque used as a target value of the steering torque to be input into the steering wheel as the command value component. The torque command value calculator calculates the torque command value by executing feedback control for allowing the steering torque input into the steering wheel to follow the target steering torque. The hysteresis basic component is added such that the target steering torque has hysteresis characteristics and changes accordingly with respect to change of the state quantity, the state quantity being an angle of the rotary shaft that rotates in relation to steering of the steering wheel.

With the above configuration, in the case of adopting the torque feedback control for controlling the steering torque to coincide with a target value, a noticeable response can be given to a driver and improvement in the steering feeling can be achieved.

The command value component calculator calculates, as the command value component, the target motor torque used as a target value of the motor torque to be generated by the motor with respect to the steering torque input into the steering wheel. The torque command value calculator calculates the torque command value by performing feedforward control of the steering torque. The hysteresis basic component is added such that the target motor torque has hysteresis characteristics and changes accordingly with respect to change of the state quantity, the state quantity being an angle of the rotary shaft that rotates in relation to steering of the steering wheel.

With the above configuration, in the case of adopting the torque feedforward control of the steering torque in calculation of the command value component, a noticeable response can be given to the driver and improvement in the steering feeling can be achieved.

The command value component calculator calculates, as the command value component, the target motor torque used as a target value of the motor torque to be generated by the motor with respect to the steering torque input into the steering wheel. The torque command value calculator calculates the torque command value by performing feedforward control of the steering torque. The hysteresis basic component includes a first hysteresis basic component and a second hysteresis basic component. The first hysteresis basic component is added such that the target motor torque has hysteresis characteristics and changes accordingly with respect to change of the state quantity, the state quantity being an angle of the rotary shaft that rotates in relation to steering of the steering wheel. The second hysteresis basic component is added such that the target motor torque has hysteresis characteristics and changes accordingly with respect to change of the state quantity, the state quantity being the steering torque.

With the above configuration, in the case of adopting the torque feedforward control of the steering torque in calculation of the command value component, it is possible to reduce occurrence of such a situation where the command value component loses hysteresis characteristics with respect to change of the state quantity, and to contribute to implementation of a desired steering feeling.

The command value component calculator calculates, as the command value component, an axial force acting on the turning shaft included in the steering device in order to perform turning of the turning wheels. The hysteresis basic component is added such that the axial force has hysteresis characteristics and changes accordingly with respect to change of the state quantity, the state quantity being an angle of the rotary shaft that rotates in relation to steering of the steering wheel.

With the above configuration, in the case of calculating the axial force acting on the turning shaft and adopting the calculated axial force as the command value component, a noticeable response can be given to the driver and improvement in the steering feeling can be achieved.

What is claimed is:

1. A steering controller configured to control a steering device, the steering device being configured to make steering torque variable by using motor torque, the steering torque being used for steering a steering wheel, the motor torque being applied by an actuator that uses a motor as a driving source, the steering controller comprising a torque command value calculator configured to calculate a torque command value used as a target value of the motor torque, wherein:

the steering controller controls operation of the motor so as to generate the motor torque corresponding to the torque command value;

the torque command value calculator has a command value component calculator configured to calculate a command value component that is added for calculation of the torque command value, and a hysteresis component calculator configured to calculate a hysteresis component added such that the command value component has hysteresis characteristics and changes accordingly with respect to change of a state quantity that changes in accordance with operation of the steering device;

the hysteresis component calculator has a hysteresis basic component calculator configured to calculate, based on the state quantity, a hysteresis basic component as a basic component of the hysteresis component, the hysteresis basic component varying such that an absolute value of the hysteresis basic component becomes larger and an absolute value of a hysteresis gradient becomes smaller as the state quantity becomes larger, the hysteresis gradient being an amount of change with respect to the state quantity, and a hysteresis differential component calculator configured to calculate a hysteresis differential component that is a component obtained by differentiating the hysteresis basic component; and the hysteresis component calculator is configured to calculate the hysteresis component by adding the hysteresis differential component to the hysteresis basic component.

2. The steering controller according to claim 1, wherein the hysteresis basic component calculator is configured to change the hysteresis basic component based on a change amount of an angle of a rotary shaft that rotates in relation to steering of the steering wheel.

3. The steering controller according to claim 1, wherein the hysteresis basic component calculator is configured to change the hysteresis basic component based on a vehicle speed.

4. The steering controller according to claim 3, wherein the hysteresis differential component calculator is configured to change the hysteresis differential component based on the vehicle speed.

* * * * *